Patented Sept. 2, 1924.

1,507,089

UNITED STATES PATENT OFFICE.

LUDWIG ROSENSTEIN, OF SAN FRANCISCO, CALIFORNIA.

METHOD OF PRODUCING ALKALI-METAL XANTHATES. REISSUED

No Drawing.   Application filed December 3, 1923. Serial No. 678,365.

*To all whom it may concern:*

Be it known that I, LUDWIG ROSENSTEIN, a citizen of the United States, residing at San Francisco, in the county of San Francisco, State of California, have invented a new and useful Method of Producing Alkali-Metal Xanthates, of which the following is a specification in such full and clear terms as will enable those skilled in the art to construct and use the same.

This invention relates to a method for the production of alkali metal xanthates, and its object is to produce such materials, in considerable quantities, upon a commercial basis.

Alkali metal xanthates, such as sodium or potassium xanthates are the salts of xanthic acid, and are produced by bringing together carbon bisulphide, alcohol, and the hydroxide of the alkali metal.

The method which is the subject of this invention, aims to bring about the reaction between the components in their nearly theoretical amounts, and to produce the xanthate largely in the solid form at once. This is accomplished by dissolving the alkali metal hydroxide in a definite amount of water, and bringing together this solution with the amounts of alcohol and carbon bisulphide corresponding to the alkali metal hydroxide used. It is desirable to keep the amount of water introduced small, in order to decrease the amount of liquid product, and to accomplish this, a part of the alkali metal hydroxide may be dissolved in alcohol to form a saturated solution and the remainder dissolved in water. Still another method of carrying out this invention consists in letting the water introduced combine with the alkali metal hydroxide to form finely divided crystals, such as $KOH2H_2O$, and bringing together these crystals with the corresponding amounts of alcohol and carbon bisulphide.

It is well known that the formation of xanthates liberates large amounts of heat. Cooling is therefore desirable, and it has even been found advantageous to introduce an inert liquid such as gasoline, benzol, or carbon tetrachloride, in which xanthates are insoluble; the purpose being to facilitate stirring and cooling.

Alkali metal xanthates are of the form indicated by the annexed diagram.

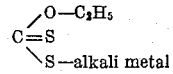

Both sodium and potassium xanthate have been produced by the methods herein disclosed.

In carrying out the invention with sodium hydroxide, 42 pounds of commercial sodium hydroxide, containing about 94% NaOH is dissolved in 13.5 liters of water. To this solution, while hot, is added denatured ethyl alcohol, 95% by volume of alcohol, and of the specific gravity of .825 to the amount of 28 liters.

The mixture is then cooled to about 20° centigrade and to it is added with constant stirring and the maintenance of the temperature of about 20° centigrade, a refined carbon bi-sulphide to the amount of 28.5 liters. After the ingredients are mixed and the mass thoroughly cooled, there is discharged about 190 pounds of a semi-solid material. This material is dried carefully at a low temperature, preferably a vacuum, and the resultant product is commercial sodium xanthate in nearly the theoretical quantity given by the chemical equation.

If potassium xanthate is to be produced, 52 pounds of commercial potassium hydroxide containing 88.2% KOH is dissolved in 12 liters of water. To this solution, while hot, is then added denatured alcohol containing 95% alcohol by volume and having a specific gravity of .825 to the amount of 22 liters and to this mixture cooled to about 20° centigrade is then added refined carbon bisulphide to the amount of 24 liters. This solution is then thoroughly mixed and the mass cooled, whereupon about 183 pounds of semi-solid material is discharged, which material when dried gives commercial potassium xanthate, in substantially the theoretrical yield of the chemical equation.

In both cases above described, the primary product is largely xanthates mixed with materials of uncertain composition produced by side reactions. These materials are in small quantity, and appear to be in the nature of thio carbonates, but their exact composition is difficult of ascertainment.

Alcohol and carbon bisulphide may be mixed first, and the aqueous solution of alkali hydroxide then added.

The above proportions may be varied, the essential points being that the alkali metal hydroxide is used in connection with water and the chemicals entering into the reaction in nearly theoretical quantity, the solid produced giving the xanthate in nearly the theoretical quantity on removal of water.

This method is entirely different from the method of producing this substance described in the literature on the subject which states that water should not be present, and it costs about one half as much to produce in this way as under other known methods.

What I claim is as follows, but modifications may be made in carrying out the invention and in the above particularly described form thereof, within the purview of the invention as defined by the annexed claims.

1. A method of producing alkali metal xanthates which consists in dissolving an alkali metal hydroxide in water, adding ethyl alcohol thereto, cooling the mixture and then adding carbon bisulphide.

2. A method of producing alkali metal xanthates which consists in dissolving an alkali metal hydroxide in water adding alcohol thereto, cooling the mass to about twenty degrees centigrade and adding carbon bisulphide.

3. A method of producing alkali metal xanthates which consists in dissolving an alkali metal hydroxide in water, adding to the solution, while hot, ethyl alcohol, cooling the mixture to about twenty degrees centigrade, adding carbon bisulphide to the mixture and then drying the resultant precipitate.

4. A method of producing alkali metal xanthates which consists in adding an alkali metal hydroxide to water, adding ethyl alcohol to the solution while hot, cooling the mixture to about twenty degrees centigrade, adding carbon bisulphide to the mixture while stirring and cooling, collecting the resultant precipitate and thereafter drying the precipitate.

5. A method of producing alkali metal xanthates which consists in bringing together an alkali metal hydroxide, water, alcohol and carbon bisulphide.

6. A method of producing alkali metal xanthates which consists in bringing an alkali metal hydroxide, water and carbon bisulphide together and then drying the solid produced.

7. A method of producing a compound containing an alkali metal, sulphur, carbon and an alcohol radical which consists in bringing together an alkali metal hydroxide, water alcohol and carbon-bisulphide.

8. A method of producing alkali metal xanthate which consists in forming fine crystals of alkali metal hydroxide containing water of crystallization and bringing together these crystals with alcohol and carbon bisulphide in the required theoretical amounts.

9. A method of producing alkali metal xanthate which consists in adding alkali metal hydroxide to water, adding ethyl alcohol to the solution, adding carbon bisulphide in the presence of a liquid in which the alkali metal xanthate is not soluble and collecting the resultant precipitate and drying same.

In testimony whereof I have hereunto set my hand this 19th day of November, A. D. 1923.

LUDWIG ROSENSTEIN.